United States Patent [19]

Ellenberger

[11] Patent Number: 4,967,644

[45] Date of Patent: Nov. 6, 1990

[54] CLUTCH CONTROL PNEUMATIC BOOST DEVICE

[75] Inventor: Gerard Ellenberger, Mornant, France

[73] Assignee: Renault Vehicules Industriels, Lyon, France

[21] Appl. No.: 358,210

[22] Filed: May 30, 1989

[30] Foreign Application Priority Data

May 27, 1988 [FR] France .................. 88 07072

[51] Int. Cl.$^5$ .................................. F15B 9/10
[52] U.S. Cl. .................. 91/374; 91/376 R; 91/519
[58] Field of Search ............ 91/374, 376 R, 519

[56] References Cited

U.S. PATENT DOCUMENTS 2,226,821  12/1940  Kempson ............ 91/374 X
4,881,449  11/1989  Horiuchi et al. ........ 91/374 X

FOREIGN PATENT DOCUMENTS 226514  12/1926  United Kingdom ........... 91/376

Primary Examiner—William E. Wayner
Attorney, Agent, or Firm—Oblon, Spivak, McClelland, Maier & Neustadt

[57] ABSTRACT

A pneumatic boost device includes a booster input including a manually actuatable upstream pusher and a downstream pusher positioned such that the movement of the upstream pusher towards the piston causes the upstream pusher to contact and move the downstream pusher toward the piston. A compressed gas is supplied to the cylinder such that the piston is moved in a direction away from the booster input by a system including a gas flow path having a first check valve, the first check valve being seatable on a seat moving with the downstream pusher. Movement of the downstream pusher thus applies a gas pressure to the piston which moves by an amount corresponding to that of the upstream pusher. The downstream pusher has a piston in the additional cylinder. Another gas flow path has a second check valve, the second check valve being seatable on a seat moving with the upstream pusher by movement of the upstream pusher toward the piston. As a result, further movement of the upstream pusher toward the piston beyond a position where the second check valve seats on the seat moving with the upstream pusher causes the downstream pusher to move toward the piston independently of the upstream pusher.

9 Claims, 2 Drawing Sheets

CLUTCH CONTROL PNEUMATIC BOOST DEVICE

BACKGROUND OF THE INVENTION

1. Field of the Invention:

This invention relates to a pneumatic boost device, particularly for control of a clutch of a motor vehicle.

2. Discussion of the Background:

The most widely used control of clutches, especially heavy-duty ones, is position control by the transfer of a volume of oil, with a pneumatic boost. To avoid the drawbacks of oil transfer systems, pneumatic and mechanical positioning systems have been proposed and developed like the one illustrated in FIG. 1. The system there shown is a follower system with an input requiring a small control energy and an output with a much greater available energy. The displacement at the output, except for the initial clearance, is perfectly linear as a function of the input set point.

The device consists of a body in which is placed a cylinder 1 with a pneumatic piston 2, which displaces an actuating rod 3 connected to the clutch mechanism. A pusher 4 is fed compressed air via orifices 5 and 6. A check valve 7 controls the intake of the compressed air into the (top) chamber of cylinder 1. A spring keeps this intake check valve 7 closed in the normal situation, the sealing being made on a seat 9, so that there is no boost. The chamber of cylinder 1 is connected to the atmosphere by an orifice 10 because a clearance exists between piston 2 and seat 8 of the check valve. The manual displacement of pusher 4 by rod 25 closes the exhaust of check valve 7 at seat 8 and opens the intake by seat 9 so that boost is applied to the chamber of cylinder 1.

The defect of this type of system is, paradoxically, that it is too reliable, i.e., it follows the displacement of the input set point too linearly. The characteristic of the gears usually used in a transmission is to require a large clutch opening clearance. With a linear control, this clearance is felt at the pedal and reduces the travel of the pedal available for metering the torque and so reduces the gradualness of the control.

SUMMARY OF THE INVENTION

The object of this invention is to provide a pneumatic boost device for control of a motor vehicle clutch which gives a clutch displacement with a nonlinear output relative to the input set point to improve the gradualness of the controlled clutch.

According to the present invention, the above and other objects are carried out by a pneumatic boost device including a cylinder, a piston in the cylinder and comprising an output member of the booster, booster input means, means for selectively supplying a compressed gas to the cylinder, and an additional cylinder. The booster input means includes a manually actuatable upstream pusher and a downstream pusher positioned such that the movement of the upstream pusher towards the piston causes the upstream pusher to contact and move the downstream pusher toward the piston. The means for selectively supplying comprises means for selectively supplying a compressed gas to the cylinder such that the piston is moved in a direction away from the booster input means, including a gas flow path having a first check valve, the first check valve being seatable on a seat moving with the downstream pusher. Movement of the downstream pusher thus applies a gas pressure to the piston and the piston moves by an amount corresponding to that of the upstream pusher. The downstream pusher comprises a piston for the additional cylinder. The means for selectively supplying a compressed gas comprises means for selectively supplying a compressed gas to the additional cylinder. Another gas flow path has a second check valve isolating the additional cylinder from the additional flow path, the second check valve being seatable on a seat moving with the upstream pusher by movement of the upstream pusher toward the piston. As a result, further movement of the upstream pusher toward the piston beyond a position wherein the second check valve seats on the seat moving with the upstream pusher opens said additional flow path and causes the downstream pusher to move toward the piston independently of the upstream pusher.

BRIEF DESCRIPTION OF THE DRAWINGS

Other characteristics and advantages of this invention will come out from the following description of an embodiment given by way of example with reference to the accompanying drawings in which.

DETAILED DESCRIPTION OF THE PREFERRED EMBODIMENT

Figure 1:
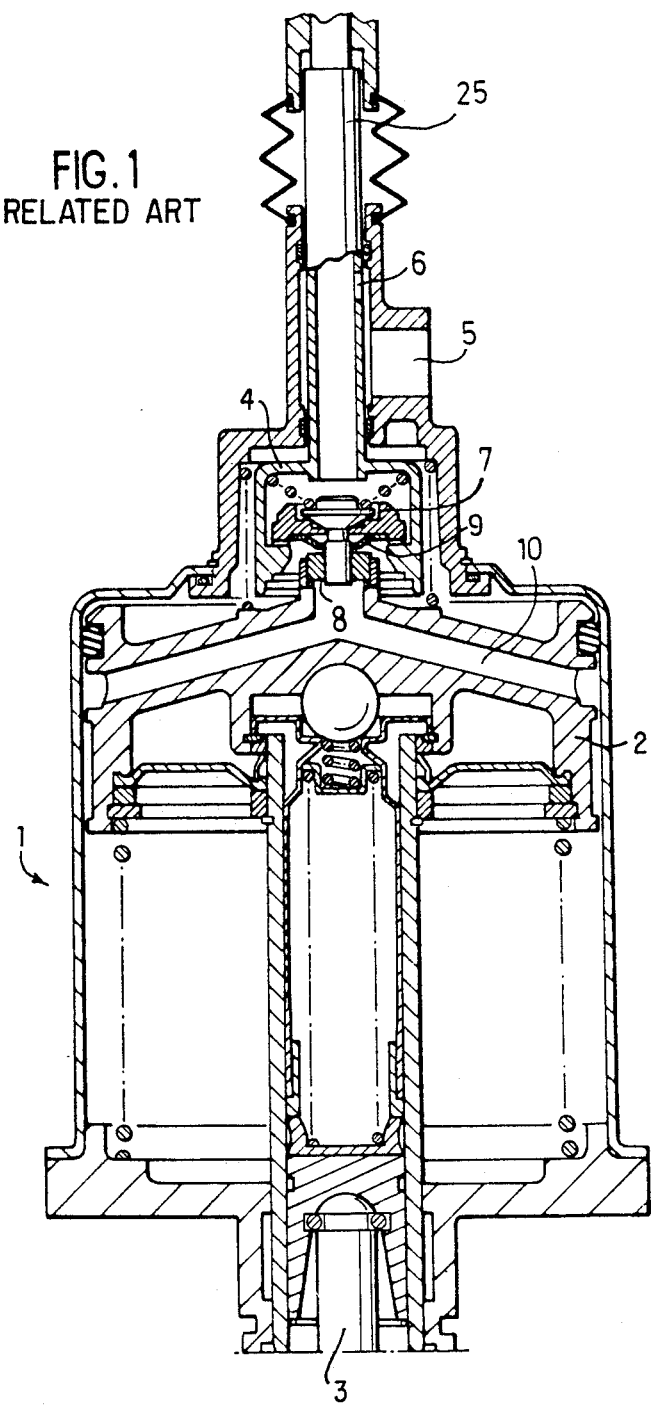
FIG. 1 shows a known clutch control boost device.
Figure 2:
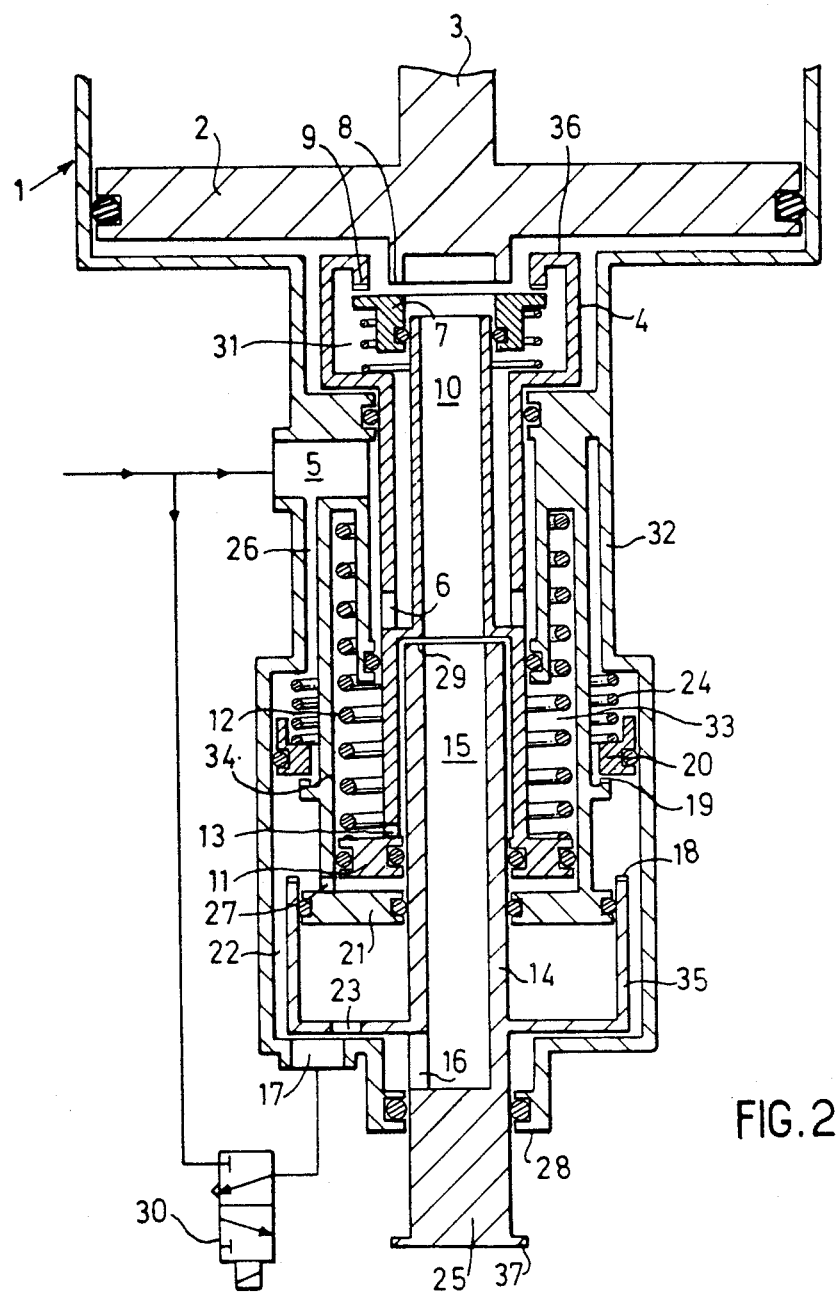
FIG. 2 is an axial section of the device according to the invention.

The clutch control pneumatic boost device comprises a cylinder, generally referenced 1, which is operated by a system of two pushers connected to the movement input. This cylinder 1 has a piston 2 that is connected to the movement output. The system of pushers comprises an upstream pusher generally referenced 14 and a downstream pusher generally referenced 4. These two pushers work together with an additional cylinder generally referenced 33. Feeding of cylinder 1 with compressed air is controlled by a first check valve 7, which seats on seat 9 of downstream pusher 4. Feeding of additional cylinder 33 is controlled by a second check valve 20, which is opened by upstream pusher 14. The unit is made so that, at first, the travel of upstream pusher 14 produces an equivalent displacement at the output movement and, next, the displacement of the movement output corresponds to the actual travel of the downstream pusher due to the additional cylinder 33, while during this time upstream pusher 14 goes through a remaining very short travel until coming to a stop. This short travel makes it possible to assure the opening of check valve 20 to feed additional cylinder 33.

The unit of the device is integrated in a body 32. One of the ends of this body 32 constitutes the body of cylinder 1, and the other end comprises an end-of-travel flange 28 of upstream pusher 14. Upstream pusher 14 has a simple support 29 which acts on downstream pusher 4. Downstream pusher 4 and upstream pusher 14 are mounted as extensions of one another.

An annular wall 34, inside body 32, ends in an end wall 21 and constitutes the body of additional cylinder 33. The upstream pusher 14 and downstream pusher 4 slide in this annular wall 34.

Downstream pusher 4 comprises, at its end located on the side of cylinder 1, the seat 9, which limits movement of check valve 7 and its return spring 31. At the other end of downstream pusher 4 is placed an annular piston 11 in additional cylinder 33, which slides in said annular wall 34, and which has a return spring 12.

Upstream pusher 14 comprises a cylindrical element 35, whose end 18 can act on check valve 20 having spring 24. Check valve 20 and its spring 24 are mounted on the outside of annular wall 34. Check valve 20 normally seats on a fixed seat 19 which is mounted on the outside of annular wall 34. Cylindrical element 35 slides on end wall 21. Upstream pusher 14 at its outside end 25 has an end-of-travel flange 37.

Downstream pusher 4 has a support face 36 which mechanically pushes on piston 2 of cylinder 1 in case of loss of the outside source of pneumatic pressure.

Feeding of cylinder 1 and of additional cylinder 33 with compressed air is first performed by an orifice 5 in body 32. Feeding of cylinder 1 is then performed by a gas flow path having an orifice 6 placed in downstream pusher 4, and feeding of additional cylinder 33 is performed by an additional flow path including orifice 27 at the end of annular wall 34. Exhaust is performed via an exhaust path including central duct 10 of downstream pusher 4 and central duct 15 of upstream pusher 14. Further, an orifice 16 is placed at the end of central duct 15 in upstream pusher 14, and an orifice 17 is placed in body 32. Finally, a vent hole 13 is placed in downstream pusher 4, and a vent hole 23 is placed in upstream pusher 14.

Thus, a centralized gas flow path feeding by orifice 5 and a centralized exhaust by orifice 17 are obtained. A solenoid valve 30 of the 3/2 type is placed between feed orifice 5 and exhaust orifice 17. Finally, actuating rod 3 of cylinder 1 has a wear compensation system.

Downstream pusher 4 may displaced parallel to the direction of movement of piston 2 under the action of upstream pusher 14 thanks to simple support 29. The input is a manual input on outside end 25 of pusher 14.

Downstream pusher 4 is fed with a stationary feed by orifice 5 and with a moving feed by orifice 6. Compressed air remains ready behind double-action check valve 7. Check valve 7 is an intake valve when it is lifted off seat 9 but remains on the seat 8, and is an exhaust valve when the seat 8 at the end of piston 2 does not rest on check valve 7. Exhaust of air from the chamber of cylinder 1 is carried out via the exhaust path including central duct 10 of downstream pusher 4, via central duct 15 of upstream pusher 14 as an extension of duct 10, and via orifices 16 and 17.

During the entire time when upstream pusher 14 does not come in contact by its end 18 against check valve 20, the unit acts like a simple positioning system; i.e., piston 2 follows the displacement in one direction or the other of downstream pusher 4, which is displaced by the action of upstream pusher 14. Thus, if upstream pusher 14 is advanced, the subsequent advance of downstream pusher 4 causes the seat 9 to lift from check valve 7 after check valve 7 seats on seat 8. This supplies compressed air to the chamber of cylinder 1. Therefore, the piston will advance by the same amount of the pushers 4 and 14. Conversely, the retraction of pushers 14 and 4 closes seat 9 and opens seat 8 to exhaust compressed air from the cylinder.

Downstream pusher 4 comprises, at its end, the annular pneumatic piston 11 on which the compressed air can act within the chamber limited by end wall 21 integral with annular wall 34. The chamber of this additional cylinder 33 is fed by orifice 27. During the entire time when end 18 of pusher 14 is not in contact with check valve 20, the chamber of additional cylinder 33 is connected with the atmosphere by an exhaust path including annular duct 22 placed between body 32 and cylinder element 35 of upstream pusher 14 and which leads to exhaust orifice 17.

After a determined travel of upstream pusher 14 (during which downstream pusher 4 is displaced by the same amount), end 18 comes in contact with check valve 20, and closes the exhaust. Then check valve 20 which is held by spring 24 is lifted by end 18 during further movement of upstream pusher 14. For this reason, it opens the compressed air intake between seat 19 and check valve 20. Thus, compressed air is routed by annular duct 26 which is between body 32 and annular wall 34 into additional cylinder 33. The compressed air cannot leave by annular exhaust duct 22, since the passage between end 18 and check valve 20 is closed.

Therefore the compressed air enters by orifice 27 between end wall 21 and annular piston 11 and causes the displacement to the end of travel of downstream pusher 4, which separates from upstream pusher 14, since the latter is no longer displaced because of the striking of flange 37 of end 25 on flange 28 of body 32.

For movements in the opposite direction of upstream pusher 14, there is, after a very short travel, the closing of intake check valve 20 on seat 19, then the opening of the exhaust between end 18 and check valve 20. Under the thrust of return spring 12, this causes the return of downstream pusher 4 to rest on upstream pusher 14, and the system again becomes a follower system. It should be noted that vent holes 13 and 23 make possible the displacement of pushers 4 and 14.

The advantage of the single exhaust by orifice 17 is to offer the possibility of locking, by electric control, the clutch in open position by the movement of solenoid valve 30, which prevents the compressed air from leaving the apparatus.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A pneumatic boost device, comprising:
   a cylinder;
   a piston in said cylinder and comprising an output member of said booster;
   booster input means comprising a manually actuatable upstream pusher and a downstream pusher positioned such that a movement of said upstream pusher towards said piston causes said upstream pusher to contact and move said downstream pusher toward said piston;
   means for selectively supplying a compressed gas to said cylinder such that said piston is moved in a direction away from said booster input means, including a gas flow path having a first check valve, said first check valve being seatable on a seat moving with said downstream pusher, whereby movement of said downstream pusher opens said first check valve to apply gas pressure to said piston and said piston moves by an amount corresponding to that of said upstream pusher;
   an additional cylinder, for which said downstream pusher comprises a piston, wherein said means for selectively supplying a compressed gas comprises means for selectively supplying a compressed gas to said additional cylinder, including another gas flow path having a second check valve isolating said additional cylinder from said additional flow path, said second check valve being seatable on a seat moving with said upstream pusher by movement of said upstream pusher toward said piston, such that further movement of said upstream pusher towards said piston beyond a position wherein said second check valve seats on said seat moving with said upstream pusher opens said additional flow path and causes said downstream pusher to move toward said piston independently of said upstream pusher.

2. The pneumatic boost device of claim 1 wherein said first check valve further comprises a seat moving with said piston, further comprising an exhaust path which is closed by said first check valve seating on said seat moving with said piston.

3. The pneumatic boost device of claim 1 wherein said second check valve further comprises a fixed seat for isolating said additional cylinder from said additional flow path, further comprising an additional exhaust path closed by said second check valve seating on said seat moving with said upstream pusher, and wherein said further movement of said upstream pusher separates said second check valve from said fixed seat.

4. The pneumatic boost device of claim 2 wherein said second check valve further comprises a fixed seat for isolating said additional cylinder from said additional flow path, further comprising an additional exhaust path closed by said second check valve seating on said seat moving with said upstream pusher, and wherein said further movement of said upstream pusher separates said second check valve from said fixed seat.

5. The pneumatic boost device of claim 4 including a body defining said additional cylinder, said body comprising stop means for said upstream pusher.

6. The pneumatic boost device of claim 4 including spring means in said additional cylinder for normally biasing said downstream pusher away from said piston.

7. The pneumatic boost device of claim 4 wherein said seat moving with said upstream pusher is formed on a cylindrical portion of said upstream pusher.

8. The pneumatic boost device of claim 1 wherein said downstream pusher includes means for mechanically engaging and pushing said piston.

9. The pneumatic boost device of claim 4 wherein said exhaust path and said additional exhaust path exit said body at a single orifice connected to a solenoid valve which selectively connects said orifice to said gas flow path.

* * * * *